US005652013A

United States Patent [19]
Patch et al.

[11] Patent Number: 5,652,013
[45] Date of Patent: Jul. 29, 1997

[54] CHEMICAL ENHANCEMENT OF SURFACE DEPOSITION

[75] Inventors: Keith D. Patch, Lexington; Dean T. Morgan, Sudbury, both of Mass.

[73] Assignee: Thermo Power Corporation, Waltham, Mass.

[21] Appl. No.: 323,818

[22] Filed: Oct. 17, 1994

[51] Int. Cl.$^{6}$ .............................. A61M 36/14; B05D 3/10

[52] U.S. Cl. .................................. 427/2.11; 427/5; 427/8; 427/242; 427/301; 427/384; 427/421; 427/430.1; 427/419.2; 427/419.5; 427/419.8

[58] Field of Search .............................. 427/2.11, 5, 301, 427/243, 421, 430.1, 384, 419.2, 419.5, 419.8, 8

[56] References Cited

U.S. PATENT DOCUMENTS 4,234,628 11/1980 DuRose ................................ 427/419.2
4,282,287 8/1981 Giese ..................................... 427/2.13
4,478,914 10/1984 Giese ..................................... 427/2.11
4,797,187 1/1989 Davis et al. ............................ 427/301
5,326,626 7/1994 Chiolsey ................................ 427/301

*Primary Examiner*—Janyce Bell
*Attorney, Agent, or Firm*—Fish & Richardson, P.C.

[57] ABSTRACT

A method and apparatus for increasing the deposition of ions onto a surface, such as the adsorption of uranium ions on the detecting surface of a radionuclide detector. The method includes the step of exposing the surface to a complexing agent, such as a phosphate ion solution, which has an affinity for the dissolved species to be deposited on the surface. This provides, for example, enhanced sensitivity of the radionuclide detector.

50 Claims, 9 Drawing Sheets

CHEMICAL ENHANCEMENT OF SURFACE DEPOSITION

BACKGROUND

This invention was made with Government support under Contract No. DE-AC05-91OR31949 awarded by the Department of Energy. The Government has certain rights in this invention.

This invention relates to methods used to enhance the deposition of dissolved species on surfaces, particularly semiconductor surfaces used for monitoring the emission from radionuclides.

Radioactive elements (i.e., radionuclides), such as natural uranium ($U^{235}/U^{238}/U^{234}$) and man-made uranium ($U^{237}$), decay and emit alpha and beta particles having, respectively, energies between 4–10 MeV and 0.1–1.0 MeV. The emitted particles can be detected in air, water, soil, or other samples to determine the level of radioactivity. In particular, samples taken from sites near weapons and fuel production facilities may contain concentrations of alpha-emitting radionuclides in excess of permitted levels.

Uranium is rated by the U.S. Environmental Protection Agency (EPA) as being a "class-A carcinogen" at very low levels. In addition, this element has a high chemical toxicity; the EPA-proposed maximum concentration limit (MCL) for uranium in public drinking water supplies is 13.5 pCi/l (about 20 ppb). Uranium present in this concentration in 1 liter of water emits about 30 alpha particles each minute.

Typically, in order to detect alpha or beta emission to determine the presence of the radionuclides at a site, it is necessary to intermittently collect samples of water or dirt from the site, and then send the samples to a laboratory for analysis. Because the permitted levels of radionuclides are low, analysis in the laboratory usually involves a lengthy and costly procedure for separating the radionuclides from the sample, concentrating them to form a thin film, and then measuring the emission from the film. For example, during a typical analytical testing procedure, the alpha-emitting radionuclides are separated from a water sample either by precipitation or evaporation; the radionuclides are then plated on a planchet (i.e., a glass or metal surface) and the emission is counted in vacuum using a biased silicon detector. The detected signals are then analyzed to determine the radionuclide concentration, which is then reported to the requestor.

Because the sample analysis is typically done off-site at a remote laboratory, the current radionuclide-monitoring procedure has several shortcomings. For example, large variations in radionuclide concentrations at the site can go undetected due to the sporadic sampling necessarily involved with the collection/analysis procedure. Due to the high cost of the procedure, only limited numbers of samples are typically taken. In addition, the analysis may be inaccurate because of the time-dependent concentrations of radionuclides at the site; the amount of radionuclides detected in the off-site laboratory may not necessarily be representative of the current on-site concentrations.

SUMMARY

In general, in one aspect, the invention provides a method of increasing the deposition rate or amount of a dissolved species, such as a radionuclide, on a surface of a substrate. The method includes the steps of contacting the surface with a solution containing a complexing agent capable of forming an insoluble complex with the dissolved species; the contacting step allows deposition of the complexing agent on portions of the surface. Following this step, the method includes the step of exposing the surface to a sample containing the dissolved species to allow formation of the insoluble complex containing the complexing agent and the dissolved species in the vicinity of the surface, thereby increasing the deposition rate or amount of the insoluble complex on the surface.

The term "complexing agent", as used herein, is meant a species which chemically or physically reacts or combines with a dissolved species to form a product that is insoluble or rendered immobile in the solution. The complexing agent may be permanently in contact with the surface, or may be replenishable. In addition, the agent may form a chemical bond with the surface prior to contact with the dissolved species, or may simply be in contact with the surface. In preferred embodiments, the complexing agent is selected from the group including inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, iodate, liguocenate, melissate, molybdate, napthaleuesulfonate, oleate, oxalate phenolate, selenate, propionate, sulfite, titanate, and tungstate ions. Preferably, the solution is formed by dissolving a compound containing the complexing agent in a solvent prior to the contacting step. In this case, the solvent preferably contains moieties selected from the group including acetone, water, alcohol, ether, and carboxylic acid moieties.

In embodiments, the method additionally includes the step of waiting a time period following the contacting step to allow deposition of the complexing agent on portions of the surface. Preferably, the time period is chosen to allow substantial evaporation of the solvent. In other embodiments, the solution is formed by dissolving a compound containing the complexing agent in an oil-based liquid prior to the exposing step.

In still other embodiments, the substrate is a porous material containing porous regions, and the contacting step additionally allows deposition of the solution in the porous regions of the substrate. The contacting step may further include the step of depositing the solution containing the contact agent in a solid material in contact with the surface. In this case, the solid material is a porous material containing porous regions, and the solution is deposited in the porous regions of the solid material.

In other preferred embodiments, the method further includes the step of increasing the flow rate of the sample during the exposing step to further increase the deposition rate of the dissolved species on the surface. The flow rate may be increased by delivering the sample to the surface. Here, the delivering step includes pumping the sample to a nozzle adapted to first receive the sample and then deliver the sample as a high pressure stream to the surface; preferably, the stream directly impinges the surface. In related embodiments, the flow rate may be increased following the exposing step by mechanically stirring the sample.

In another aspect, the invention provides a method of increasing the deposition rate or amount of a dissolved species on a surface of a substrate which includes the step of contacting the surface with both a solution containing a complexing agent capable of forming an insoluble complex with the dissolved species and a sample containing the dissolved species. The contacting step allows the formation of the insoluble complex containing the complexing agent and the dissolved species in the vicinity of the surface, thereby increasing the deposition rate or amount of the insoluble complex on the surface.

In another aspect, the invention provides a method of increasing the sensitivity of a radionuclide-emission detector using all of the various steps described above.

In yet another aspect, the invention provides a method of increasing the sensitivity of a radionuclide-emission detector by increasing the deposition rate or amount of a dissolved species on a detecting surface of the detector. In this case, the method includes the step of flowing a sample containing the dissolved species with a flow rate over the detecting surface, thereby increasing the deposition rate or amount of the dissolved species on the detecting surface, and increasing the sensitivity of the radionuclide-emission detector. In this case, the steps used in previous embodiments are used to increase the flow rate.

In another aspect, the invention provides a detector for detecting the emission from a radionuclide present in a sample. The detector includes a detection chamber for enclosing the sample, and a semiconductor substrate including a detecting surface forming an interior portion of the detection chamber. During operation, when the sample is delivered to the detection chamber, the detecting surface is in direct contact with a thin region of a complexing agent-containing residue which facilitates deposition of the radionuclide on the detecting surface to increase the amount of emission received by the semiconductor substrate.

In preferred embodiments, the complexing agent-containing residue forms a coating, preferably of uniform thickness, to substantially cover the detecting surface.

The detector (i.e., either a chemically treated or untreated detector) may include means for increasing the flow rate of the sample in the detection chamber. Preferably, these means include a nozzle adapted to deliver a pressurized liquid sample as a high pressure stream to the detection chamber to impinge the detecting surface. Alternatively, the means for increasing the flow rate include a mechanical stirrer inserted in the detection chamber.

In alternate embodiments, the thin region of the complexing agent-containing residue is dissolved in an oil-based liquid in contact with the detecting surface. The thin region of the complexing agent-containing residue may also be deposited in a solid material containing porous regions in contact with the detecting surface, or may be deposited in porous regions of the substrate.

In another aspect, the invention provides a leak-proof, light-tight chamber for enclosing a liquid sample over a range of temperatures. The chamber includes a semiconductor substrate including a detecting surface forming the bottom portion of the chamber; a metal cap forming the top portion of the chamber; and, a lining containing an upper and lower edge and a acid and base-resistant inner surface configured to surround the liquid sample and form the side portions of the chamber. The upper edge of the lining is in contact with at least one upper o-ring in contact with the metal cap, and the lower edge of the lining is in contact with at least one lower o-ring in contact with the semiconductor substrate. The chamber also includes means for providing a mechanical sealing force between the upper edge of the lining and the metal cap, and between the lower edge of the lining and the detecting surface. The force simultaneously compresses the upper o-rings against the upper edge and the metal cap, and the lower o-rings against the lower edge and the detecting surface to maintain a leak-proof, light-tight seal in the chamber over the range of temperatures.

Accordingly, the chemically enhanced radionuclide detector has an increased sensitivity, and can be used on-site to rapidly measure alpha or beta particle emission in a cost-efficient manner. This allows, for example, high-resolution, real-time monitoring of natural or man-made radionuclides, such as uranium, plutonium, and bismuth.

DETAILED DESCRIPTION

Figure 1:
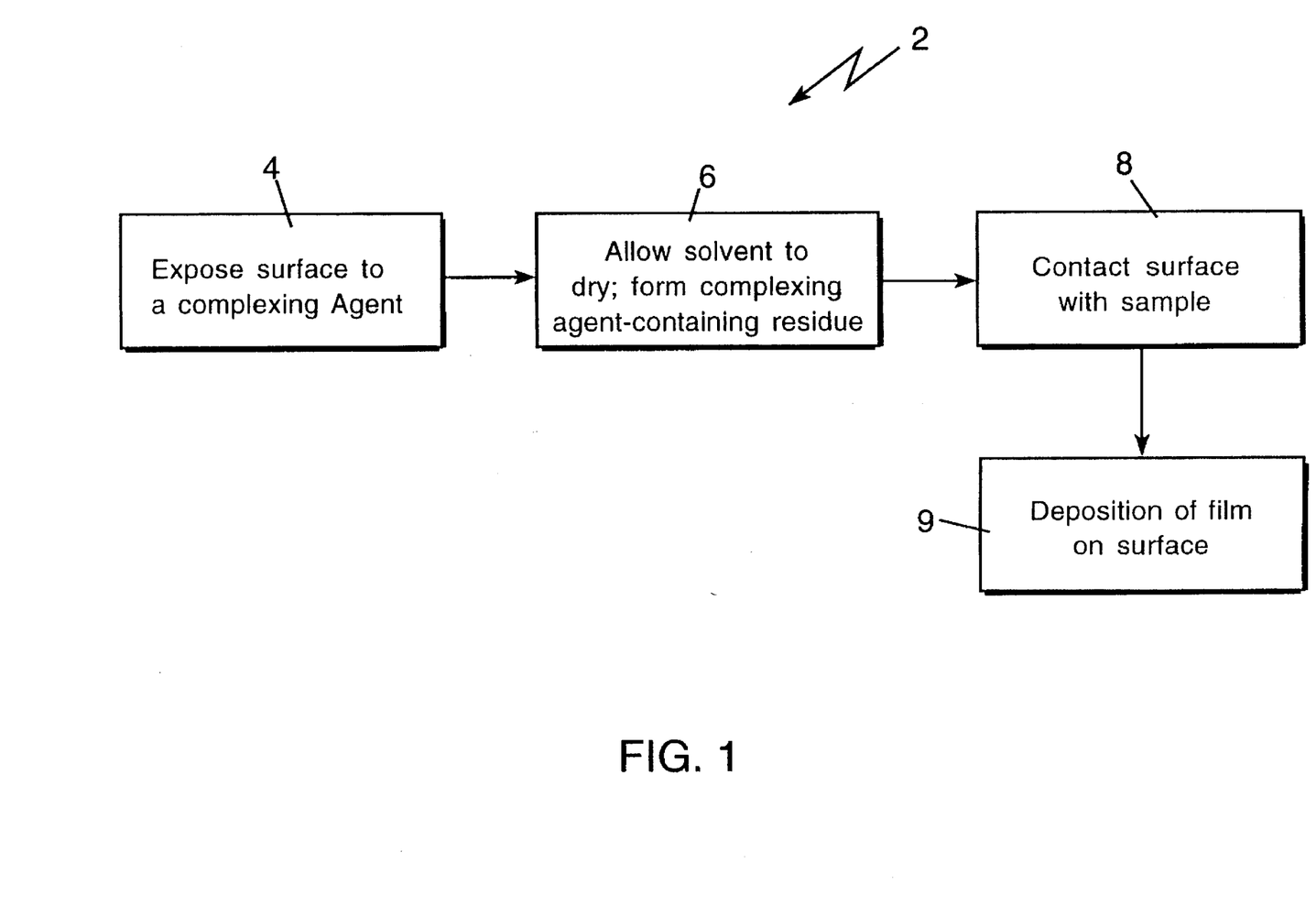
FIG. 1 is a schematic view of the steps used in the surface adsorption method according to the invention.

Referring now to FIG. 1, a method 2 for increasing the rate of deposition of ions onto a surface, such as a detecting surface of a radionuclide detector, includes the step 4 of treating the surface with a solution containing an aqueous or non-aqueous solvent and a complexing agent having an affinity for the ion, resulting in the formation of a thin complexing agent-containing residue on the surface. For example, phosphate ions formed by the dissolution of phosphoric acid in acetone may be formed in a solution, and then deposited by soaking the surface in the solution and allowing the surface to dry. The complexing agent may also be applied to the surface in an aerosolized or gaseous form. Alternatively, the complexing agent may be left in a liquid phase on the surface. In this case, the complexing agent may be dissolved in an oil on the surface, or may be suspended in a capillary network in contact with or contained within the surface. Preferably, the residue forms a continuous film of substantially even thickness on the surface. The complexing agent-containing solution may also be deposited in a porous material, which is then placed in contact with the surface. Alternatively, if the surface is porous, the solution may be deposited therein. When a suitable amount of the complexing agent-containing residue is deposited, the surface is contacted 8 with a fluid sample containing the ions of interest, causing release of the complexing agents. In this way, the complexing agents are made available to complex with the ions present in the fluid solution. For example, when the surface is treated with phosphoric acid, ionic forces between the phosphate ion and the uranyl ion ($UO^{2+}$) present in aqueous solutions of uranium drives the complexation between these two species, resulting in the formation of an insoluble salt. Complexation occurs in close vicinity to the surface/sample interface, resulting in the salt being rapidly deposited 9 on the surface as a continuous or segmented thin film.

The above-described process can be used to extract high quantities of metal ions from a fluid solution, and selectively deposit complexes (e.g., salts) of those ions on the treated regions of the substrate. This technique, when used in combination with a sensor, can be used for detection of the presence of these ions, and may be used in combination with radionuclide detectors and ion exchange materials. The method is particularly effective for extracting ions from dilute liquid solutions. Thus, the method may be used to extract ions from the sample, so as to purify the solution, as in waste clean-up.

Figure 2A:
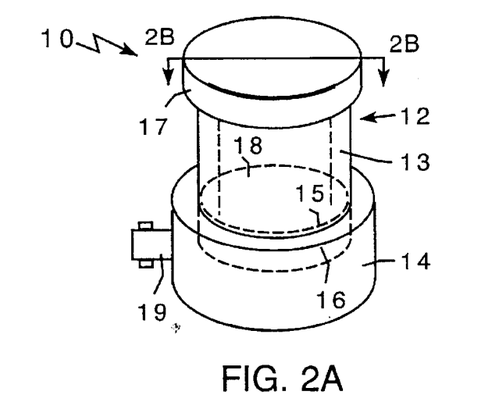
FIGS. 2A and 2B show, respectively, side and cross-sectional views of a chemically treated radionuclide detector according to the invention.
Figure 2B:
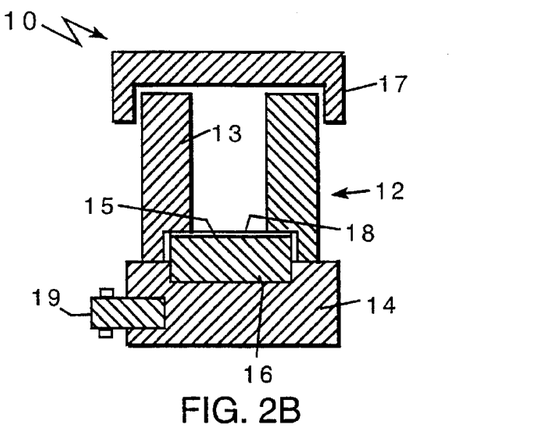
Figure 3:
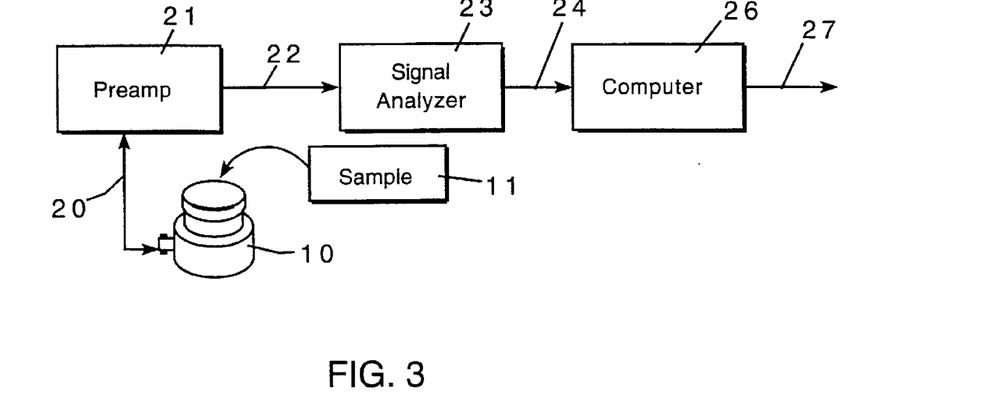
FIG. 3 is a schematic view of the signal processing steps used in combination with the radionuclide detector to analyze the signal from the detector.

With reference to FIGS. 2 and 3, a portable detector 10 having a detecting surface chemically treated according to the invention is used to detect for the presence of radionuclides in a fluid sample. The detector 10 includes a cup portion 12 containing an inert acid and base-resistant container 13 for holding a sample 11 (i.e., a water, gas, or soil sample) during a measurement procedure, and a base portion 14 for housing a semiconductor substrate 15 (e.g., a silicon detector) used to detect the radionuclides. The semiconductor substrate 15 is typically thin (e.g., about 500 microns in thickness) and is often mounted on a secondary substrate 16 (e.g., aluminum) for support. A leak-proof, light-tight cap 17 is used for sealing the sample 11 within the detector.

In order to enhance the sensitivity of the detector 10, thereby allowing, for example, on-site, real-time detection of small amounts of radionuclides, a surface 18 of the semiconductor substrate 15 in direct contact with the sample 11 is chemically treated to facilitate deposition of the radionuclide. This treatment involves exposing the surface 18 to a complexing agent-containing solution, such as phosphoric acid, in order to form regions of a complexing agent-based residue (e.g., a residue containing phosphate ions) in contact with the surface 18. Once the sample is delivered to the cup portion, the residue can be hydrolyzed, causing the complexing agent to diffuse away from the surface. Complexation between the phosphate ion and an ionic form of the radionuclide contained in the sample occurs in the vicinity of the substrate surface 18, facilitating a "plating out" or adsorption of the radionuclide onto the surface 18, resulting in the formation of islands or a continuous film of the emitting radionuclide material. Direct contact between the emitting material and the semiconductor surface 18 increases the amount of radionuclide emission absorbed by the semiconductor detector.

During operation, the sample 11 is introduced to the cup portion 12 of the detector 10, where it is held by the container 13. Once the sample is inserted and the film begins plating out on the semiconductor surface, the semiconductor substrate 15 is biased by applying a voltage to the supporting substrate 16. Emission of either an alpha or beta particle by the radionuclide adsorbed on the biased substrate 15 results in the generation of an electrical signal (i.e., a voltage output) which is then sent through a connector 19 along the signal line 20. The current output is proportional to the energy of the adsorbed particle.

The signal generated by the detector may first be processed with a preamplifier 21, which preferably includes circuitry having integrating and differentiating time constants to shape the input signal. Following processing by the preamplifier, the shaped signal may be additionally amplified using, e.g., standard high-bandwidth current amplifiers. Once amplified to a suitable level, the signal is sent along a line 22 to a signal analyzer 23, such as a multichannel analyzer, where it is registered as a "count" indicating a detected alpha or beta particle. The count is stored in a "bin" corresponding to the energy of the particle. Processing with the signal analyzer 23 results in the generation of an x-y array of points, with the x values corresponding to the energy of the adsorbed particle, and the y values corresponding to the number of counts registered for the particular energy. The x-y array of points is then sent along a signal line 24 to a computer 26 for analysis, resulting in the generation of an additional signal which is sent along a line 27 to, e.g., a process controller.

With reference now to FIGS. 4A–4D, the sensitivity of the radionuclide detector is enhanced prior to delivering the sample 11 to the container 13 by exposing the top surface 18 of the semiconductor substrate 15 to a chemical treatment, resulting in the formation of a thin residue 30 of the enhancing chemical. Chemical treatment preferably involves first washing the surface with a concentrated hydrochloric acid solution to remove any metals which may be adhering to the surface of the detector. This provides a "clean" surface, which is then treated with an aqueous acetone solution containing a complexing agent capable of complexing with the radionuclide. Preferably, the surface is treated with a solution of phosphoric acid ($H_3PO_4$) and acetone for a period of time sufficient to allow the acetone to dry, resulting in the formation of a residue containing the phosphate ion. Alternatively, the surface is treated with an oil or other viscous material capable of suspending the complexing agent. Solutions containing complexing agents capable of forming complexes (e.g., salts) with ionic species containing radionuclides (e.g., $UO^{2+}$) are used for the chemical treatment. The solution may be aqueous or nonaqueous, and may contain, for example, combinations of solvents. Preferably, the solvent is volatile to allow rapid drying and formation of the residue. In addition to phosphoric acid, solutions containing the complexing agents may be used to treat the detector surface. Such solution may contain, for example, inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, iodate, liguocenate, melissate, molybdate, napthaleuesulfonate, oleate, oxalate phenolate, selenate, propionate, sulfite, titanate, or tungstate ions. Exposure may be accomplished by soaking the detector with the complexing agent containing solution, applying the solution in an aerosolized form, applying an oil or other viscous liquid which contains the solution, or placing a capillary-containing material, such as a polymer, which contains the solution in contact with the detector. In addition, gaseous treatments may be used to chemically enhance the detector. Preferably, an even coat of complexing agent-based residue is formed over the face of the detector. The complexing agent concentration is preferably varied to adjust the sensitivity of the detector. In addition, the solution containing the complexing agent should not degrade the inner walls of the container 13 (indicated in FIGS. 4A–4C by the surface 40), which are preferably composed of teflon, polyvinylidene fluoride (PVDF), glass, or another suitable material. Following its treatment by a complexing agent-containing material, the silicon surface 18 may be rinsed with deionized water to remove any residual acid, and then dried. Heat delivered in the form of hot air, microwave radiation, or other suitable means may be used to accelerate the drying process.

The treatment method can be used to enhance the detection efficiency of commercially available radionuclide detectors. For example, the "Liquid Analyzer System 100", manufactured by Quantrad Sensor (2360 Owen St., Santa Clara, Calif. 95054), may be modified in this fashion. This detection system is described in the Quantrad Sensor Operation Manual (September, 1992; revision 1.1), the contents of which are incorporated herein by reference.

Figure 4A:
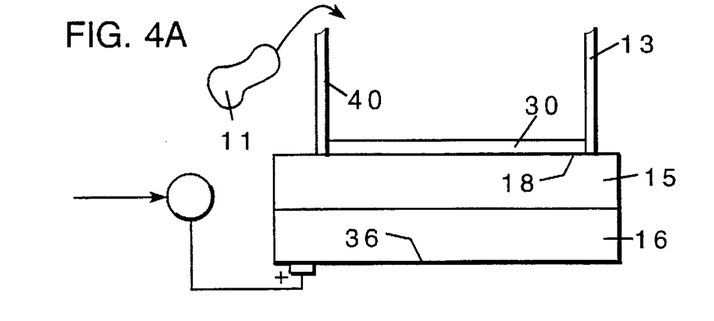
FIGS. 4A–4D show, respectively, side schematic views of the chemically treated semiconductor substrate used in the radionuclide detector prior to contact with the sample, during contact with the sample, after the plating-out process, and during the signal generation process.
Figure 4B:
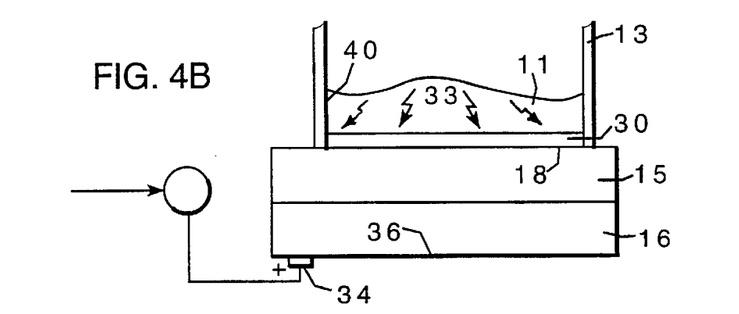
Figure 4C:
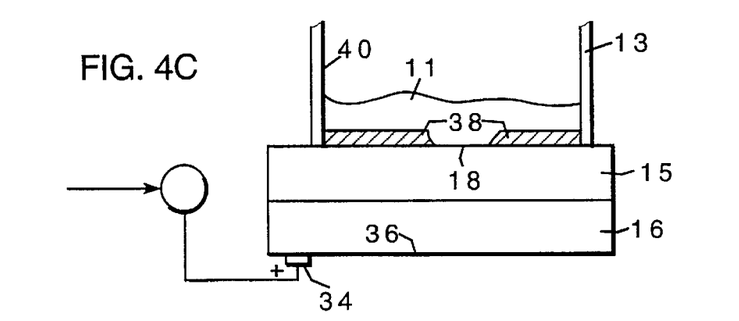
Figure 4D:
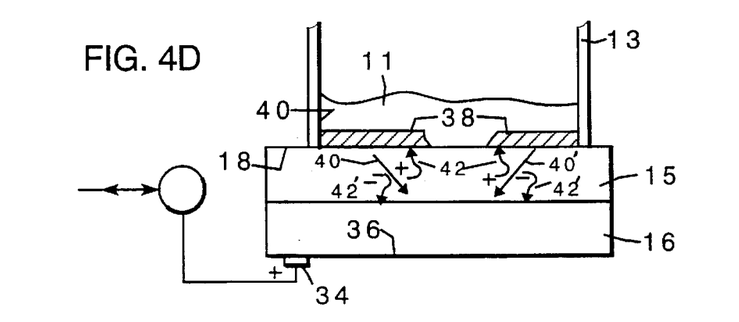

With reference now to FIGS. 4B–4D, during operation of the radionuclide detector, exposure of the treated silicon surface 18 to an aqueous, uranium-containing solution 11 results in diffusion, for example, of uranyl ions (indicated in FIG. 4B by the arrows 33) toward the thin layer 30. In uranium-containing samples, ionic forces drive the complexation between phosphate ions and the uranyl ion; these reactions take place rapidly and in close vicinity to the silicon surface, resulting in the formation of regions 38 of an alpha particle-emitting salt. The salt forms an ultra-thin (typically between 500 and 1000 Å) radiation source which effectively couples emission into the silicon substrate. For example, because alpha (or beta) particles are emitted from the radionuclide isotopically and in all directions, nearly 50% of the emission from the regions 38 will be absorbed by the silicon.

Emission from the regions 38 (indicated in FIG. 4D by the arrows 40, 40') is absorbed throughout the depletion region of the silicon substrate 18, resulting in the generation of charge carriers 42, 42' (i.e., electron-hole pairs) having lifetimes which are long compared to the time required for the charge carriers to drift through the semiconductor substrate 15. For alpha particles, the energy necessary to form an electron-hole pair in silicon is about 3.6 eV per pair; thus, a large number of charge carriers will be generated for each particle. The charge carriers generate a time-dependent electrical signal (typically having a duration of between 1–15 nanoseconds) having an intensity proportional to the energy of the emitted particle; the time dependence of the electrical signal depends on whether the particle is an alpha or beta particle.

For a detector to have high energy resolution, it is necessary to minimize the materials that the emission passes through before reaching the silicon surface. Typically, alpha particles can only travel about 40 microns before being completely absorbed by a surrounding medium (such as water). Thus, when the emitting material is dispersed throughout a liquid sample, particles having the same energy, but emitted in different regions along the surrounding medium, will reach the detector with different energies, decreasing detector resolution and sensitivity. Only those alpha particles originating within the 40 micron layer adjacent to the detector will be counted. This problem is ameliorated in the present invention, where the plating out of the radiation source on the silicon surface minimizes (or eliminates) the path length between the emitting radionuclides and the silicon. This decreases the attenuation of the emission, and necessarily results in a highly resolved detected signal. The high resolution of the detector is especially beneficial when two radionuclides emitting particles of similar energies are present in the sample. The resolution of the detector described herein is typically between about 15–30 keV FWHM for 5 MeV alpha particles.

Radionuclides other than uranium (as the uranyl ion) can be precipitated by various complexing agents onto the surface of the silicon detector. In particular, radionuclides such as thorium, bismuth, polonium, lead, plutonium, and radium have been shown to form water-insoluble complexes with phosphoric acid. Detection of these compounds, therefore, is expected to be enhanced by treating the silicon with phosphoric acid prior to use.

Preferably, the semiconductor substrate which is chemically treated is made from ultra-high purity (i.e., nearly intrinsic) single-crystalline silicon processed using a double-diffusion technique where a heavily doped P layer is diffused into the bottom surface of the silicon, and a lightly doped N layer is diffused onto the top surface. This results in a silicon diode of the p-n or p-i-n structure. Ion-implanted detectors may also be used. The diode is preferably operated under reverse bias (using, e.g., between 25–75 volts for alpha spectroscopy), resulting in the formation of an electric field across the intrinsic region (i.e., the junction region) of the silicon. In order to increase its detection efficiency, the exposed silicon has a large surface area, preferably between about 300–4000 mm$^2$. Other types of semiconducting materials, such as GaAs, AlGaAs, germanium and lithium-based materials may also be used as the detector. The silicon thickness is chosen so that emission over a wide range of particle energies can be absorbed in the depletion region; preferably, the silicon has a thickness of between about 100–700 microns.

In general, the amount of ions plated out on the chemically treated or untreated surfaces can be enhanced by increasing the flow rate between the ion-containing fluid and the surface. Preferably, the flow rate is increased using mechanical stirring or jet-impingement methods. For example, when used alone or in combination with the radionuclide detector, liquid samples pumped under pressure through a jet nozzle can be caused to impinge on the silicon surface at high velocities (typically between 10–20 ft/sec), resulting in an increase in transfer of radionuclides (relative to static solutions) to the silicon surface. Similarly, the mass transfer rate may be increased by mechanically stirring the sample solution inside the detector cup. Both of these mechanisms increase the amount of material plated out on the chemically treated (or untreated) silicon surface, thereby increasing the amount of emission absorbed by the detector.

Figure 5:
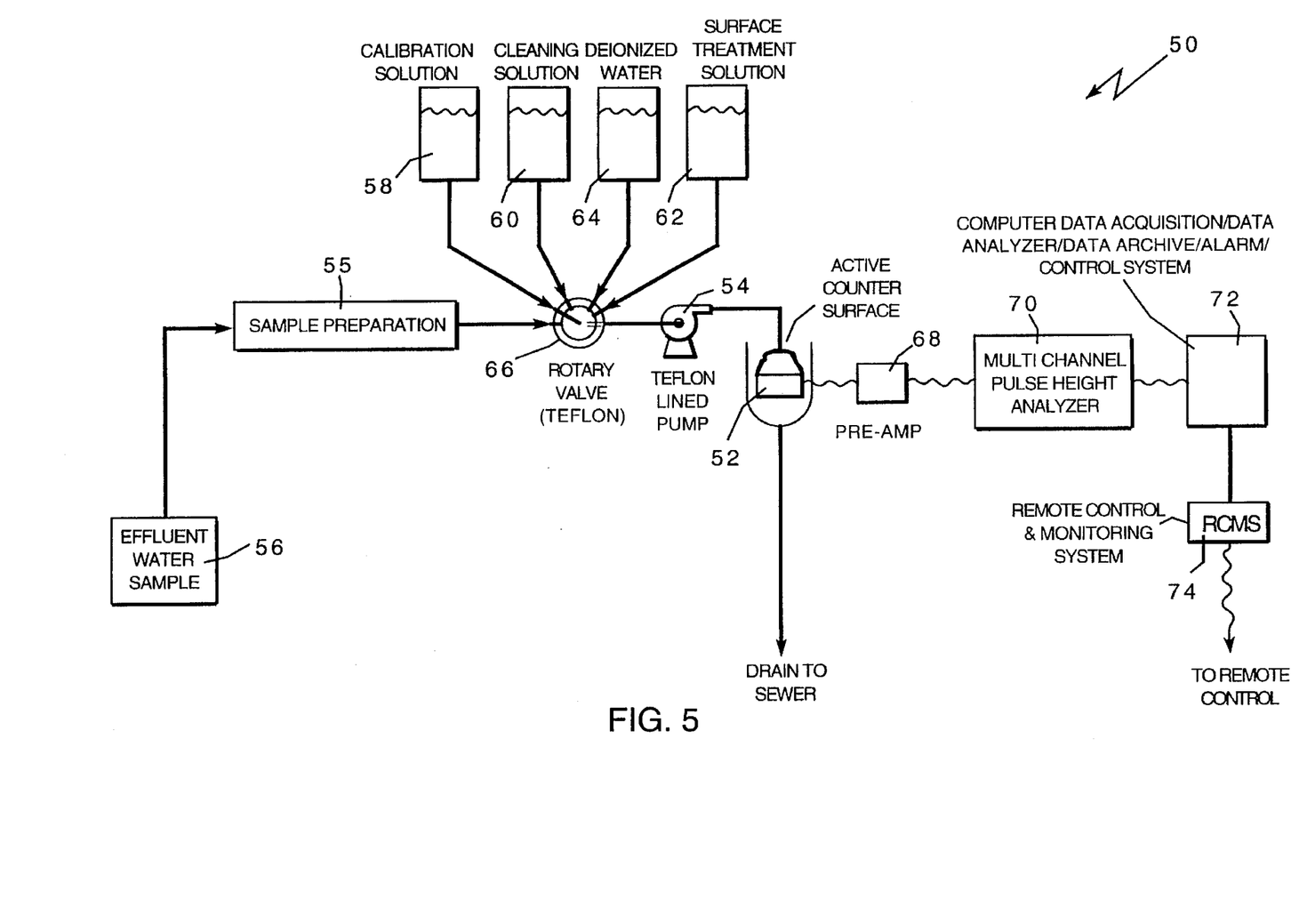
FIG. 5 is a schematic view of the jet-impingement components used with a single radionuclide detector.

With reference now to FIG. 5, a radionuclide detection system 50 using jet impingement to increase the rate of mass transfer between a radionuclide and the surface of the detector 52 includes a teflon-lined pump 54 which delivers a liquid sample 56 (i.e., an effluent water sample) to a jet nozzle with a flow rate of between about 1 and 5 liters/min. Before being pumped, the sample may first be prepared (indicated in the figure by box 55) using, for example, a filter to remove any debris, or an additive which allows the pH to be optimized for adsorption. Once prepared and pumped, the sample flows through the jet nozzle and impinges onto the detector surface to enhance the amount of radionuclide delivered.

In order to monitor gaseous samples, the jet-impingement system may be used in combination with cryogenic equipment. In this case, the gas may be passed through a heat exchanging device in contact with a cryogenic fluid, such as liquid nitrogen, in order to liquify the gas. The liquified gas may then be pumped through a nozzle, cooled below the gas/liquid phase transition temperature, and delivered to the surface of the detector. This allows, for example, uranium levels in air and other gasses to be monitored.

The jet impingement system may be augmented to allow, in addition to the liquid sample 56, calibration 58, cleaning 60, surface treatment 62, and deionized rinse water 64 solutions to impinge the detector surface. This allows for an automated system in which the detector 52 may be calibrated, cleaned, and chemically treated between runs, thereby enabling the liquid sample to be extracted from a source and continuously monitored for a selected period of time. In this case, the appropriate solution is sequentially selected using a teflon rotary valve 66, and then pumped through the nozzle to impinge on the detector surface. After the radionuclides are deposited on the detector surface, emission results in the generation of an electrical signal by the detector 52, which is then preferentially sent to a preamplifier 68 and then processed with a multi-channel pulse-height analyzer 70 to generate an emission spectrum. This spectrum can then be stored and analyzed by a computer 72 to determine the presence of the radionuclides. Once the sample is monitored and the presence of radionuclides is detected, a signal is sent to a remote control and monitoring system 74, and the liquid sample can be discharged back to the source.

Multiple rotary valves and pumps may be included in the jet-impingement system 50 to independently deliver solutions to more than one detector. This allows a first detector to be cleaned and chemically prepared while a second detector is monitoring the flowing sample. After a select time period, the sample flow is switched to the second detector, and the first detector is cleaned and prepared.

Figure 6:
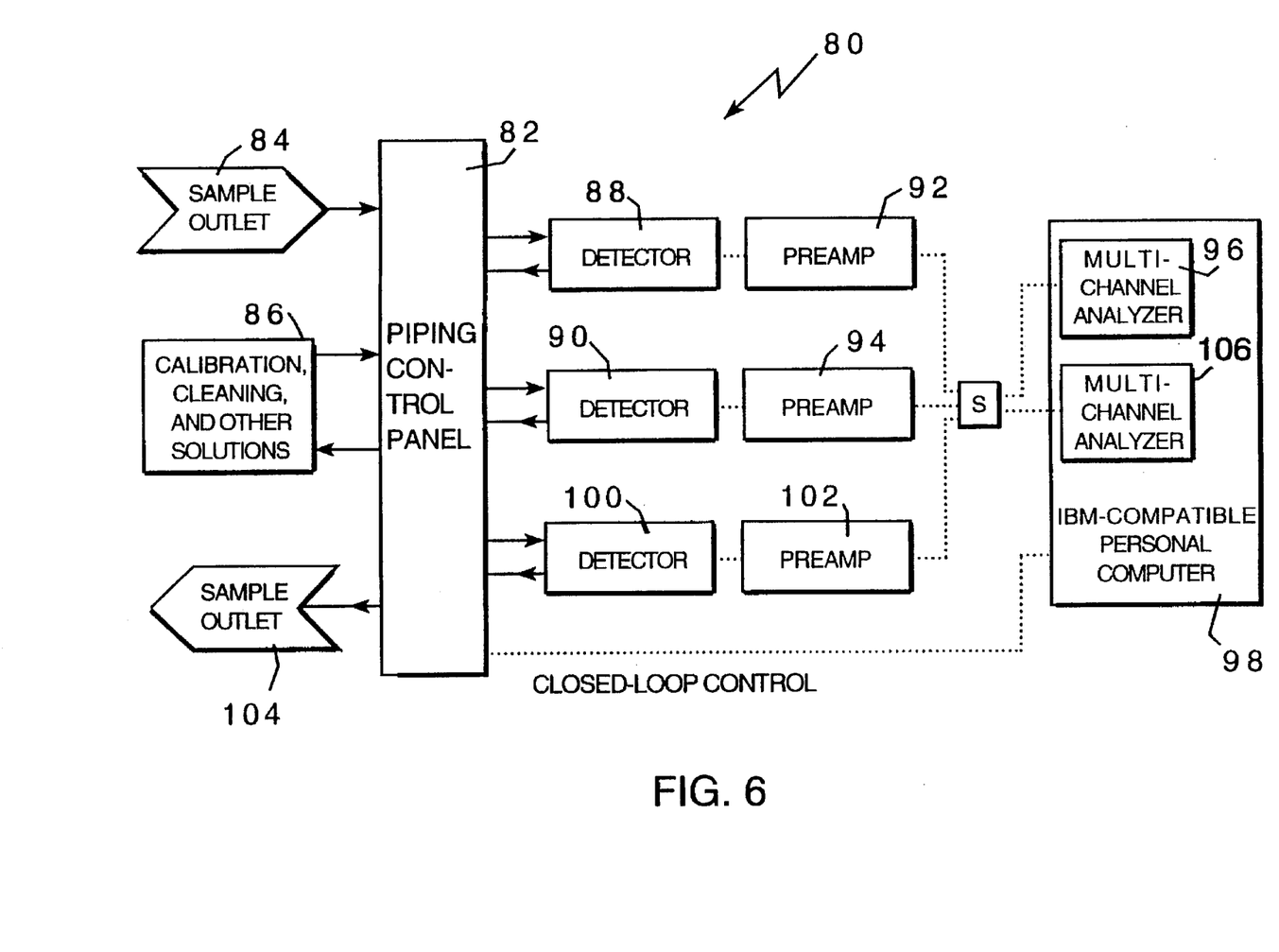
FIG. 6 is a schematic view of the jet-impingement components used in combination with multiple detectors.

With reference now to FIG. 6, a detection system 80 incorporating three detectors includes a piping control panel 82 configured to receive the pumped liquid sample 84, along with the cleaning, calibrating, chemical treating and rinse solutions 86. The sample is pumped to a first chemically treated detector 88 for on-line analysis during a set time period (preferably between 1 and 60 minutes). During the analysis period, the piping control panel is configured to allow a second detector 90 to undergo chemical cleaning and reactivation in order to prepare it for on-line analysis (the preferred steps of the cleaning/activation cycle, and their associated time periods, are listed in Table 1, below). After the period has expired, the sample from the first detector is discharged through a sample outlet 104, the piping control panel 82 delivers a new sample to the second detector 90, and the first detector is cleaned and prepared for detection. Both detectors are configured to generate electrical signals in response to radionuclide emission; as before, these signal are amplified (using preamplifiers 92, 94) before being sent to a multichannel analyzer card 96 contained in a computer 98. The system is configured so that the sample delivery, cleaning and treating, and signal generation processes are continually repeated, allowing the first and second detectors to provide un-interrupted on-line analysis.

In addition, a third detector 100 may be used in combination with a preamplifier 102 and a second multichannel analyzer 104 to perform periodic automatic calibration and background measurements without affecting the on-line sampling process. This allows verification that each detector is properly calibrated and cleaned, as well as ensuring that very low background levels exist. For example, if one of the detectors 88, 90 is not properly cleaned prior to it analysis period, a high signal level will be generated due to the presence of residual amounts of radionuclide remaining on the detector surface. In this case, comparison of the measured signal level with that generated by the third detector 100 would indicate a erroneously high background signal; the system could then be interrupted in order for the detector to be cleaned. Thus, three detectors used in this manner provide continuous monitoring on liquid samples, even when high levels of radionuclides are present.

TABLE 1

| Preferred Cleaning/Reactivation Cycle | |
|---|---|
| Step | Time Period |
| Soak detector surface in dilute hydrochloric acid to remove plated radionuclide. | 1 minute. |
| Rinse detector surface with deionized water. | 1 minute. |
| Allow detector surface to dry. | 1 minute. |
| Expose detector surface with phosphoric acid solution. | 1 minute. |
| Allow detector surface to dry. | 1 minute. |

In addition to using the jet-impingement method, an increase in the rate of transfer of the radionuclide to the detector's surface can be accomplished through rapid stirring of the solution contained within the detector cup. This allows fresh portions of the sample to continually move from the bulk of the sample to the periphery of the detector cup, thereby maximizing the possibility that the radionuclides will be adsorbed onto the detector's surface. In general, in order to minimize the potential for generating electromagnetic interference (EMI) which may adversely affect the level of the detected signal, the rapid stirring is preferably accomplished with air-driven motors, as opposed to electric motors. Stirring is preferably accomplished with a stirring impeller, such as a two-bladed radial-flow design impeller mounted on a rotating shaft.

Figure 7:
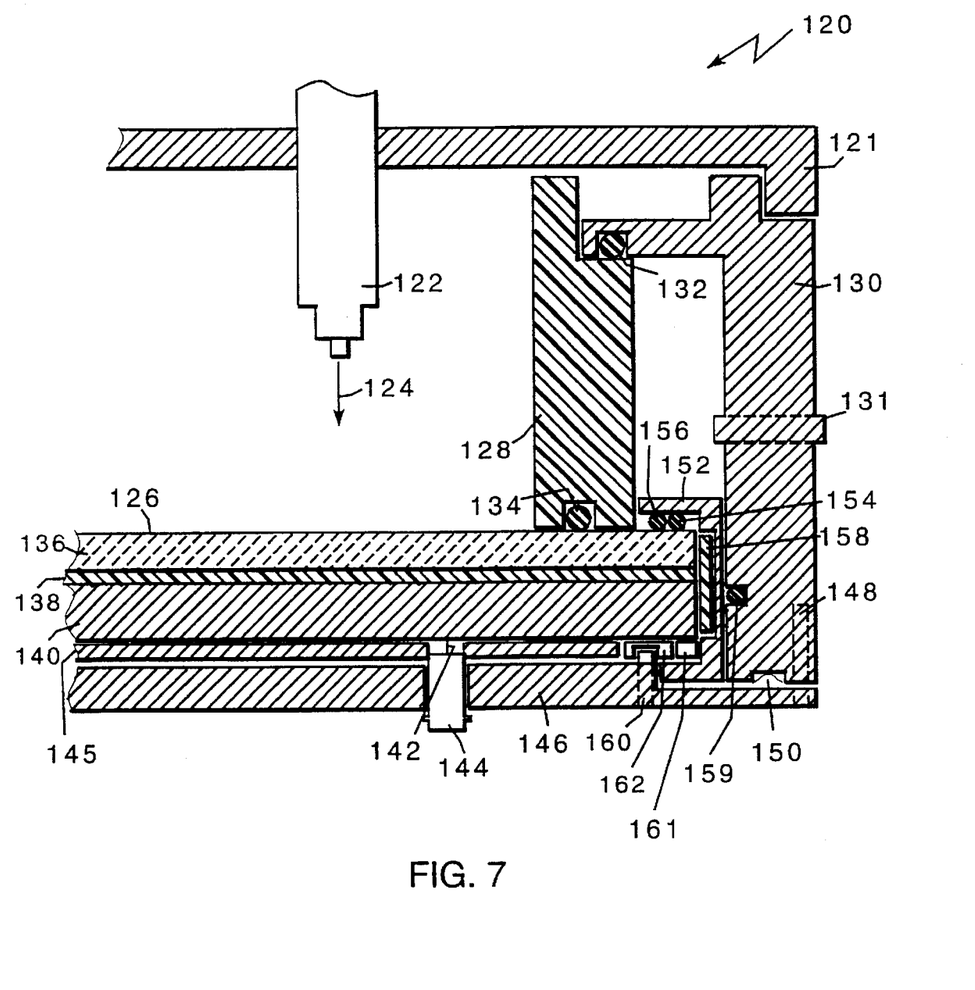
FIG. 7 is a cross-sectional view of a detector cup assembly used to hold a sample in the radionuclide detector.

FIG. 7 shows a substantially leak-proof detector cup assembly 120, which is of particular importance when stirring or jet impingement is used to enhance the rate of mass transfer onto the detector surface. In the assembly 120, a non-adhesive mechanism is used to form the leak-tight seal; all sealing is done by applying a force on the top and bottom portions on the assembly walls. In particular, the assembly 120 used to measure liquids containing radionuclides includes a cap 121 which supports a nozzle 122 used for delivering a liquid sample onto the detector surface 126. The flow of the liquid is indicated in the figure by the arrow 124. In general, the cup assembly provides primary and secondary sealing to prevent leaks, and is configured so that mismatches in thermal expansion of the various components can be accounted for, allowing for a leak-proof seal over a broad range of temperatures.

The interior lining 128 of the cup assembly 120 is preferably composed of a acid and base-resistant polymeric material, such as teflon-coated silicon rubber or PVDF, and is sealed against the top portion of a metal housing 130 (preferably composed of stainless steel) using a o-ring 132 composed of teflon or viton rubber. Using a second o-ring 134, the bottom portion of the lining 128 is compressed against the top surface 126 of the silicon detector 134, which, in turn, is in contact with a layer of conductive rubber 138 deposited on a metal substrate 140 in electrical contact via an electrical lead 142 with a connector 144 (such as a BNC connector) supported by a backplate 145.

A bottom plate 146 of the leak-proof assembly is attached to the metal housing 130 using a bolt assembly 148, and a wave spring 150 is seated in a groove extending circularly along the bottom surface of the metal housing 130. A vacuum port 131 in the housing 130 allows the assembly to be evacuated, if necessary. A metal bracket 152 in contact with the bottom plate 146 is sealed against the surface 126 of the silicon detector 136 using a conductive o-ring 154 and a viton (or teflon) o-ring 156 providing a secondary seal. The bracket 152 is separated from the metal substrate 140, conductive rubber layer 138, and the silicon detector 136 using an electrically insulating slab 158 and a spacer 161. An additional o-ring 159 is used to seal the bracket 152 against the side of the metal housing 130. In order to provide the leak-proof seal, an adjustable compressional force is applied using a bolt 160 in contact with an insulating washer 162. When screwed into the bottom plate 146, the bolt 160 allows the lining 128 to be compressed between the silicon detector 136 and the top portion of the metal housing 130, thus sealing it from leaks.

OTHER EMBODIMENTS

The surfaces of materials contained in other devices may be chemically treated with complexing agent-containing solutions to increase the deposition rates of solvated ions. For example, ion exchange materials or silica gels, silica sand, or zeolytes may be treated to increase the exchange rate between cations and anions in solution and the substrate, such as the gel or resin. Similarly, a surface acting as a filter may be chemically treated so as to increase the extraction of ions from an ion-containing solution.

EXAMPLES

The following examples relate to the chemically enhanced radionuclide detector.

Example 1

Chemical Enhancement

Figure 8:
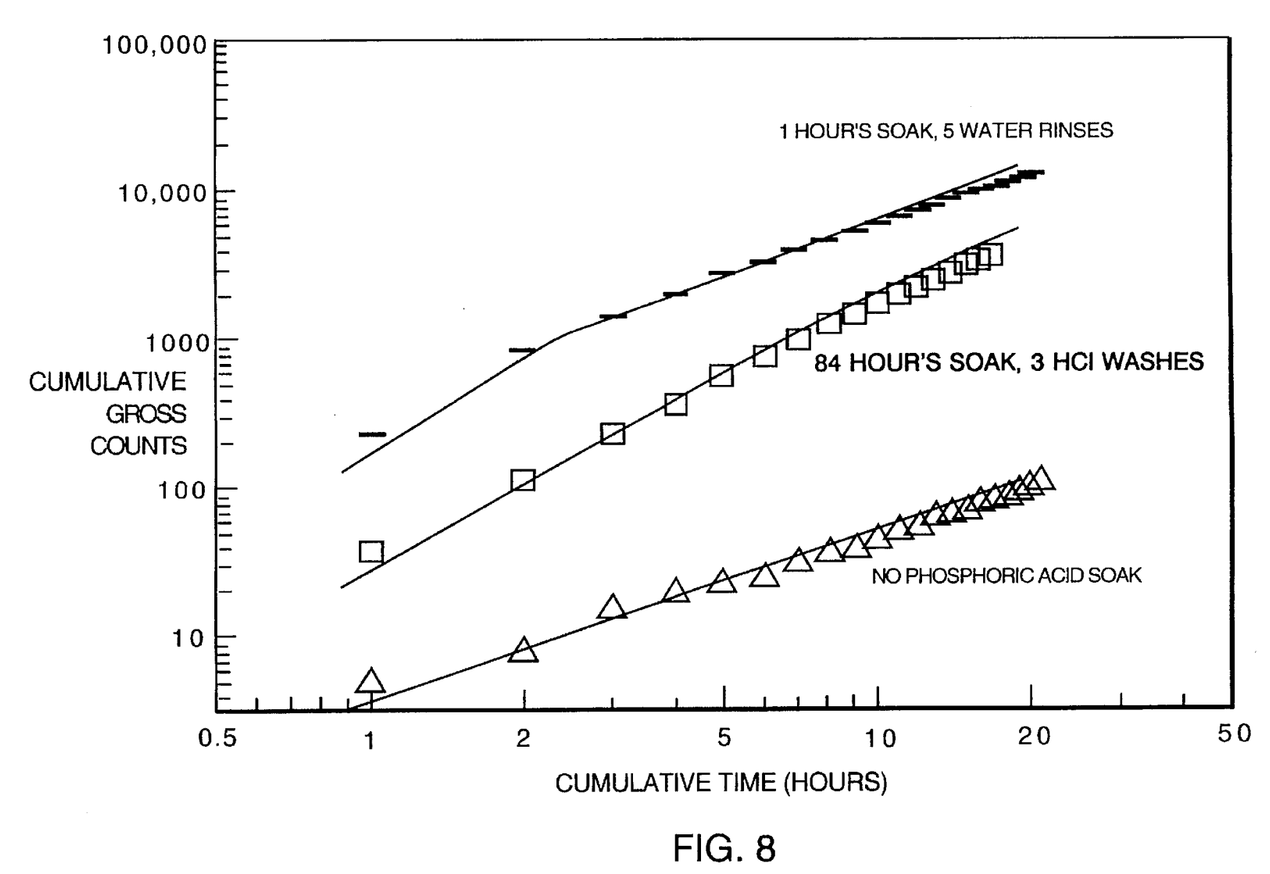
FIG. 8 is a plot showing the number of counts registered as a function of time for the conventional and chemically treated nuclide detectors.

In order to chemically enhance the detector surface, a 3-cm$^2$ silicon detector contained in a Quantrad Liquid Analyzer System 100 detector (Quantrad Sensor; 2360 Owen St., Santa Clara, Calif. 95054) was treated with: (a) a 37% (with water) hydrochloric acid solution for a time period of 5 minutes; (b) a deionized water rinse; and (c) a solution of aqueous phosphoric acid ($4.84 \times 10^{-4}$ by weight) dissolved in acetone (99%) and water (1%) for a time period of between 1 and 84 hours. A 10-ml sample of 10 ppb–10 ppm aqueous uranium prepared from and Aldrich AA standard solution was then added to the detector cup. FIG. 8 illustrates the improvement (approximately a factor of 100 compared to a conventional detector) in count rate between the chemically enhanced detectors (squares and bars in the plot) and the conventional detector (triangles). The plot indicates the robust character of the plated-out emitting film; even after 3 HCl rinses, the cumulative gross counts are between 80 and 100 times greater than those registered using a conventional detector.

The effectiveness of the phosphoric acid chemical treatment can be gauged not only by comparing the cumulative number of counts between treated and untreated detectors, but also by measuring the ratio between the alpha particle activity and the calculated total activity of the subject uranium solution. For example, the calculated total activity of a 10-cm$^3$ sample of liquid containing 10 ppm uranium is 4474 counts per hour (cph). A single-atom layer of hydrogen uranium phosphate generates nine counts per hour. In comparison, using the chemical enhancement method, a higher concentration of the uranium is plated out on the chemically enhanced detector, resulting in the equilibrium hourly counting rate approaching 1200 cph, or approximately 30% of the theoretical 4474 cph in the sample. The ability to measure such a large fraction of the total activity contained in the 10 ppm solution indicates the benefit of the chemical enhancement method.

Figure 9:
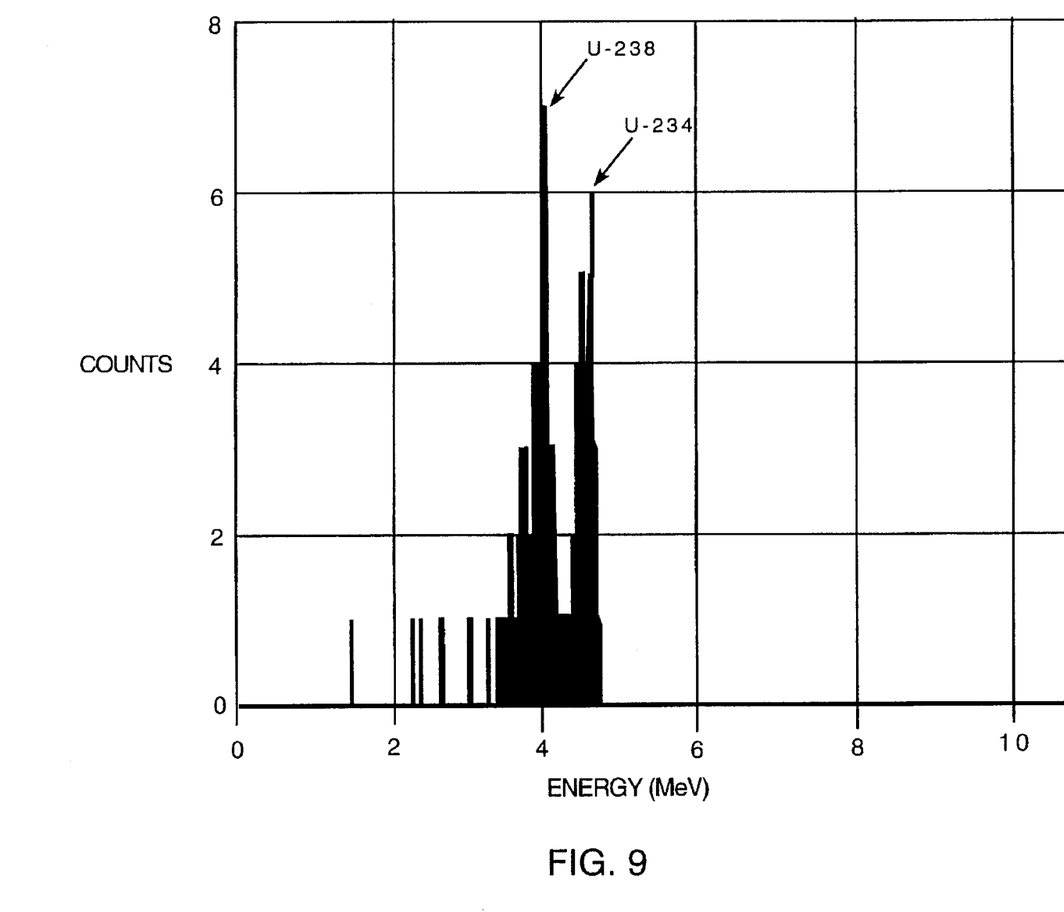
FIG. 9 is a spectrum taken from a uranium-containing sample using the chemically enhanced detector.

With reference now to FIG. 9, a spectrum taken over a time period of 45 minutes using the above-identified chemically enhanced detector clearly shows the presence of $U^{238}$ and $U^{234}$ in a 10-ppm uranium-containing solution. In this example, two factors appear to contribute to the enhanced performance of the detector. First, the detector was oven-dried for one hour to maximize the dryness of the silicon surface. Second, prior to adding the uranium-containing solution to the detector cup, the solution was neutralized with a 1% potassium hydroxide solution, and a two-hour time period was allowed to elapse. The solution was then placed in the detector cup, and monitored during the 45-minute sample counting period, resulting in clear identification of a $U^{238}$ peak (having a height of 7 counts) and a $U^{234}$ peak (6 counts). A total of 146 alpha particles were recorded in the 45-minute interval; 45 of these counts were integrated by gaussian peak analysis and identified as relating to $U^{238}$ or $U^{234}$, at an average error of approximately 30%. FIG. 9 clearly identifies the presence of the isotopes in the laboratory-prepared sample in a remarkably short count time. Conditions similar to those used in the test would allow easy identification of uranium at the NRC regulatory limit, which is currently set at 4.43 ppm, during a short period of time.

Example 2

Pumped-Flow Mass Transfer

As discussed herein, the transfer of radionuclides to the silicon detector surface can be accelerated by using a jet-impingement method. This action serves to continually expose the detector surface to fresh uranium-containing solution, thereby maximizing the possibility of adsorbing uranium on the detector's face.

In order to determine the increase in detector sensitivity using the jet-impingement method, a non-chemically enhanced detector was modified to incorporate a single jet directly above the silicon surface. The inner diameter of the jet nozzle was 0.180 in. Sample flowing into the jet at a rate of 1.71 liters/min resulted in the sample having a velocity of 5.7 ft/sec emerging from the nozzle. In a separate experiment, the inner diameter of the nozzle was adjusted to 0.102 in., and a sample having a flow rate of 1.68 liters/min resulted in a velocity of 17.4 ft/sec after the nozzle.

In general, both experimental conditions resulted in the detection of uranium being significantly enhanced. In addition, the uranium plated out on the detector surface was not removed after washing the surface with water. A hydrochloric acid wash was used to effectively remove adsorbed radionuclides between samples, resulting in a very low background count. Furthermore, pumping of the sample solution to enhance mass transfer resulted in a change in the resultant spectral peak shape. The semi-gaussian peak envelope, normally indicative of a thin monolayer of plated-out radionuclide, was not observed. Instead, the peak had a non-gaussian shape and included a pronounced low-energy tail, indicating the presence of a thick alpha source.

Figure 10A:
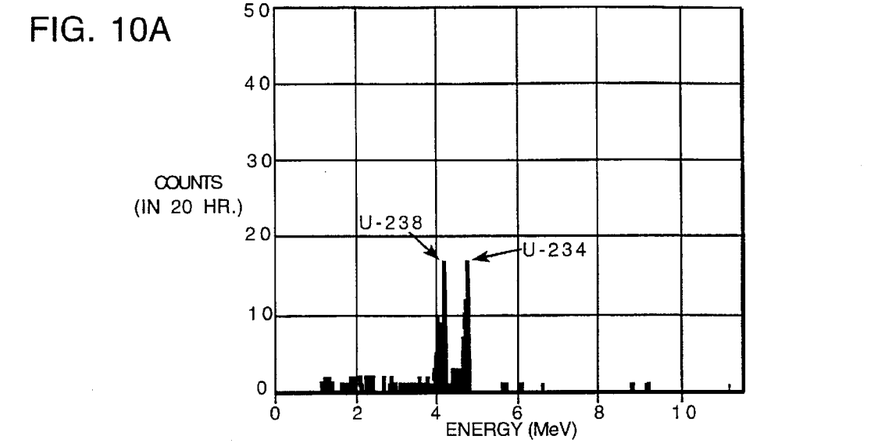
FIGS. 10A–10C show spectra taken from a uranium-containing sample when the velocities of the samples at the jet are, respectively, 0, 5.7, and 17.4 ft/sec.
Figure 10B:
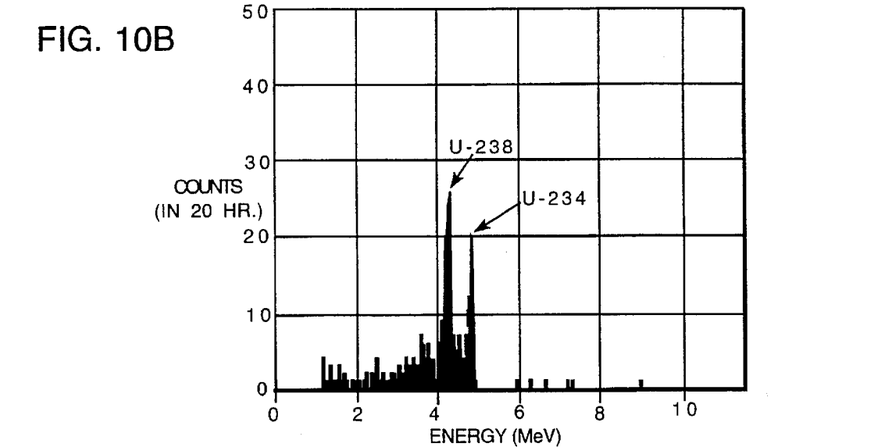
Figure 10C:
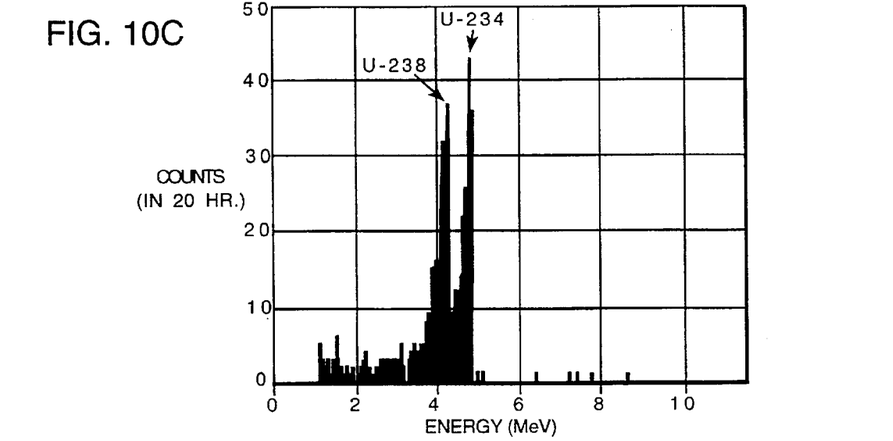

With reference to FIGS. 10A–10C, the ability of the jet-impingement detector to monitor uranium present as 10 ppm in an aqueous solution is increased with the velocity of the solution at the jet nozzle. The total counts registered after 20 hours (for a non-chemically treated detector) are listed in Table 2, below. In each case, the total counts were determined by subtracting out the background and totaling the appropriate channels for each peak.

TABLE 2

Enhancement of Detection Efficiency Using Jet Impingement: Total Counts

| Mode | Total Counts | Enhancement |
| --- | --- | --- |
| Non-pumped (FIG. 10A) | 162 ± 14 | — |
| 5.7 ft/sec Jet (FIG. 10B) | 189 ± 17 | 1.17 |
| 17.4 ft/sec Jet (FIG. 10C) | 439 ± 27 | 2.71 |

The results after 20 hrs. based on peak height alone are summarized in Table 3, below.

TABLE 3

Enhancement of Detection Efficiency Using Jet Impingement: Average Peak Height

| Mode | Average Peak Height (counts) | Enhancement |
| --- | --- | --- |
| Non-pumped (FIG. 10A) | 17 | — |
| 5.7 ft/sec Jet (FIG. 10B) | 23 | 1.35 |
| 17.4 ft/sec Jet (FIG. 10C) | 40 | 2.35 |

The results summarized in Tables 2 and 3 indicate that the use of higher pumping flow rates and/or multiple nozzles will continue to increase the enhancement effect. In particular, it is expected that additional increases in the nozzle velocity will yield an enhancement factor well in excess of 2.71; detection sensitivity is expected to increase by a factor of at least 4 at higher jet velocities.

Example 3

Enhanced Detector Using Combined Chemical Enhancement and Jet Impingement

The combination of chemical enhancement and jet impingement is expected to allow increased enhancement of the detector sensitivity relative to the use of either of these enhancing techniques, alone. As discussed in Example 1, use of chemical enhancement increases the sensitivity of the detector by more than two orders of magnitude. The time required for a conventional detector to detect the regulatory limit of 4.43 ppm of a solution of aqueous uranium is approximately 20 hours. Thus, by chemically enhancing the surface of the detector, this time period is shortened to approximately 102 minutes. Further implementation of the jet impingement technique is expected to reduce this time period in a linear, additive way, resulting in a time period of as low as 26 minutes to count the regulatory uranium concentration.

While the invention has been shown and described in connection with embodiments in which surfaces are treated with complexing agent-containing materials prior to contact of the surface with a sample, complexing agent-containing materials may be supplied while the sample is in contact with the surface, as an alternative to, or in addition to, pre-treatment of the surface. For example, a solution of complexing agent-containing material may be released near the surface on which ion deposition is desired, either as part of or separate from a jet impingement nozzle.

Other embodiments are within the scope of the following claims.

What is claimed is:

1. A method for detecting an amount of a dissolved species from which emission is radiated in a sample contacted with a surface of a substrate, said method comprising the steps of:

(a) contacting the surface with a solution containing a complexing agent, said contacting step depositing the complexing agent on portions of the surface;

(b) exposing the surface following said contacting step with the sample containing the dissolved species to allow the complexing agent to render the dissolved species immobile in the vicinity of the surface; and, (c) detecting emission radiated from the dissolved species to determine the amount of dissolved species in the sample.

2. The method of claim 1, wherein the complexing agent is selected from the group consisting of inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, iodate, lignocenate, melissate, molybdate, napthaleuesulfonate, oleate, oxalate phenolate, selenate, propionate, sulfite, titanate, and tungstate ions.

3. The method of claim 2, wherein the solution used in said contacting step is formed by dissolving a compound containing the complexing agent in an oil-based liquid.

4. The method of claim 2, wherein the solution is formed by dissolving a compound containing the complexing agent in a solvent prior to said contacting step.

5. The method of claim 4, wherein said solvent contains moieties selected from the group consisting of acetone, water, alcohol, ether, and carboxylic acid moieties.

6. The method of claim 4, further comprising waiting a time period following said contacting step to allow deposition of the complexing agent on portions of the surface.

7. The method of claim 6, wherein said time period is chosen to allow substantial evaporation of the solvent.

8. The method of claim 1, wherein the substrate is a porous material containing porous regions, and said contacting step additionally allows deposition of the solution in the porous regions of the substrate.

9. The method of claim 1, wherein said contacting step further includes the step of depositing the solution in a solid material in contact with the surface.

10. The method of claim 9, wherein the solid material is a porous material containing porous regions, and the solution is deposited in the porous regions of the solid material.

11. The method of claim 1, further comprising increasing the flow rate of the sample during said contacting step to further increase the deposition rate of the dissolved species deposited on the surface.

12. The method of claim 11, wherein the flow rate is increased by delivering the sample as a high-pressure stream to the surface.

13. The method of claim 12, wherein said delivering step comprises pumping the sample to a nozzle adapted to first receive the sample and then deliver the sample as a high-pressure stream to the surface.

14. The method of claim 13, further comprising directly impinging the high-pressure stream onto the surface.

15. The method of claim 1, further comprising increasing the flow rate of the sample over the surface of the substrate during said exposing step.

16. The method of claim 15, wherein the flow rate over the surface of the substrate is increased by mechanically stirring the sample.

17. A method for detecting an amount of a dissolved species from which emission is radiated in a sample in contact with a surface of a substrate, said method comprising the steps of:

- contacting the surface with both a solution containing a complexing agent and a sample containing the dissolved species, the complexing agent rendering the dissolved species immobile in the vicinity of the surface; and
- detecting emission radiated from the dissolved species to determine the amount of dissolved species in the sample.

18. A method of increasing the sensitivity of a radionuclide-emission detector, said method comprising the steps of:

(a) contacting a detecting surface of a substrate of the detector with a solution containing a complexing agent, said contacting step depositing the complexing agent on portions of the detecting surface; and (b) exposing the detecting surface following said contacting step with a sample containing the radionuclide so that the complexing agent renders the radionuclide immobile in the vicinity of the detecting surface, thereby increasing the rate or amount of radionuclide deposition on the detecting surface and increasing the sensitivity of the radionuclide-emission detector.

19. The method of claim 18, wherein the complexing agent is selected from the group consisting of inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, iodate, liguocenate, melissate, molybdate, napthaleuesulfonate, oleate, oxalate phenolate, selenate, propionate, sulfite, titanate, and tungstate ions.

20. The method of claim 19, wherein the solution used in said contacting step is formed by dissolving a compound containing the complexing agent in an oil-based liquid.

21. The method of claim 19, wherein the solution is formed by dissolving a compound containing the complexing agent in a solvent prior to said contacting step.

22. The method of claim 21, wherein said solvent contains moieties selected from the group consisting of acetone, water, alcohol, ether, and carboxylic acid moieties.

23. The method of claim 21, further comprising waiting a time period following said contacting step to allow deposition of the complexing agent on portions of the detecting surface.

24. The method of claim 23, wherein said time period is chosen to allow substantial evaporation of the solvent.

25. The method of claim 18, wherein the substrate is a porous material containing porous regions, and said contacting step additionally allows deposition of the solution in the porous regions of the substrate.

26. The method of claim 18, wherein said contacting step further includes the step of depositing the solution in a solid material in contact with said detecting surface.

27. The method of claim 26, wherein the solid material is a porous material containing porous regions, and the solution is deposited in the porous regions of said solid material.

28. The method of claim 18, further comprising increasing the flow rate of the sample during said exposing step to further increase the deposition rate or amount of the dissolved species deposited on the detecting surface.

29. The method of claim 28, wherein the flow rate is increased by delivering the sample as a high-pressure stream to the detecting surface.

30. The method of claim 29, wherein said delivering step comprises pumping the sample to a nozzle adapted to first receive the sample and then deliver the sample as a high-pressure stream to the detecting surface.

31. The method of claim 30, further comprising directly impinging the high-pressure stream onto the detecting surface.

32. The method of claim 18, further comprising increasing the flow rate of the sample over the surface of the substrate during said exposing step.

33. The method of claim 32, wherein the flow rate over the surface of the substrate is increased by mechanically stirring the sample.

34. A method of increasing the sensitivity of a radionuclide-emission detector by increasing the deposition rate or amount of a dissolved species deposited on a detecting surface of the detector, said method comprising the step of:

flowing a sample containing the dissolved species at a flow rate over the detecting surface, thereby increasing the deposition rate or amount of the dissolved species deposited on the detecting surface and increasing the sensitivity of the radionuclide-emission detector.

35. The method of claim 34, wherein the flow rate is increased by delivering the sample as a high-pressure stream to the detecting surface.

36. The method of claim 35, wherein said delivering comprises pumping the sample to a nozzle adapted to first receive the sample and then deliver the sample as a high-pressure stream to the detecting surface.

37. The method of claim 36, further comprising directly impinging the high-pressure stream onto the detecting surface.

38. The method of claim 34, wherein the flow rate over the surface of the substrate is increased by mechanically stirring the sample.

39. A method of increasing the deposition rate or amount of a dissolved species deposited on a surface of a substrate, said method comprising the steps of:

(a) contacting the surface with a solution containing a complexing agent which forms a complex with the dissolved species, the solution being formed by dissolving a compound containing the complexing agent in an oil-based liquid, said contacting step depositing the complexing agent on portions of the surface; and, (b) exposing the surface following said contacting step with a sample containing the dissolved species to form the complex containing the complexing agent and the dissolved species in the vicinity of the surface, thereby increasing the deposition rate or amount of the complex deposited on the surface.

40. A method of increasing the deposition rate or amount of a dissolved species deposited on a surface of a substrate, said method comprising the steps of:

(a) contacting the surface with a solution containing a complexing agent which forms a complex with the dissolved species, wherein the solution is deposited in a solid material in contact with the surface so that the complexing agent is deposited on portions of the surface; and, (b) exposing the surface following said contacting step with a sample containing the dissolved species to form the complex containing the complexing agent and the dissolved species in the vicinity of the surface, thereby increasing the deposition rate or amount of the complex deposited on the surface.

41. A method of increasing the deposition rate or amount of a dissolved species deposited on a surface of a substrate, said method comprising the steps of:

(a) contacting the surface with a solution containing a complexing agent which forms a complex with the dissolved species, said contacting step depositing the complexing agent on portions of the surface; and, (b) exposing the surface following said contacting step with a sample containing the dissolved species, with the sample being delivered in a high-pressure stream to form the complex containing the complexing agent and the dissolved species in the vicinity of the surface, thereby increasing the deposition rate or amount of the complex deposited on the surface.

42. A method of increasing the sensitivity of a radionuclide-emission detector, said method comprising the steps of:

(a) contacting a detecting surface of a substrate of the detector with a solution containing a complexing agent selected from the group consisting of inorganic or organic phosphates, orthophosphite, phosphinic, phosphorous, phosphinic, hypophosphate, abietate, antimonate, arsenate, borate, butyrate, caprate, acetate, caproate, caprylate, cerotate, chromate, cyanate, ferrocyanide, iodate, liguocenate, melissate, molybdate, napthaleuesulfonate, oleate, oxalate phenolate, selenate, propionate, sulfite, titanate, and tungstate ions, wherein the complexing agent forms a complex with an ionic form of the radionuclide in the vicinity of the surface, said contacting step depositing the complexing agent on portions of the detecting surface; and, (b) exposing the detecting surface following said contacting step with a sample containing the radionuclide to form a complex containing the complexing agent and the radionuclide in the vicinity of the detecting surface, thereby increasing the rate or amount of radionuclide deposition on the detecting surface and increasing the sensitivity of the radionuclide-emission detector.

43. A method of increasing the sensitivity of a radionuclide-emission detector, said method comprising the steps of:

(a) contacting a detecting surface of a substrate of the detector with a solution containing a complexing agent which forms a complex with an ionic form of the radionuclide in the vicinity of the surface, the complexing agent being dissolved in an oil-based liquid, said contacting step depositing the complexing agent on portions of the detecting surface; and, (b) exposing the detecting surface following said contacting step with a sample containing the radionuclide to form a complex containing the complexing agent and the radionuclide in the vicinity of the detecting surface, thereby increasing the rate or amount of radionuclide deposition on the detecting surface and increasing the sensitivity of the radionuclide-emission detector.

44. A method of increasing the sensitivity of a radionuclide-emission detector, said method comprising the steps of:

(a) contacting a detecting surface of a substrate of the detector with a solution containing a complexing agent which forms a complex with an ionic form of the radionuclide in the vicinity of the surface, said contacting comprising depositing the solution in a solid material in contact with the detecting surface to deposit the complexing agent on portions of the detecting surface; and, (b) exposing the detecting surface following said contacting step with a sample containing the radionuclide to form a complex containing the-complexing agent and the radionuclide in the vicinity of the detecting surface, thereby increasing the rate or amount of radionuclide deposition on the detecting surface and increasing the sensitivity of the radionuclide-emission detector.

45. The method of claim 44, wherein the solid material is a porous material containing porous regions, and the solution is deposited in the porous regions of said solid material.

46. A method of increasing the sensitivity of a radionuclide-emission detector, said method comprising the steps of:

(a) contacting a detecting surface of a substrate of the detector with a solution containing a complexing agent which forms a complex with an ionic form of the radionuclide in the vicinity of the surface; and, (b) exposing the detecting surface following said contacting step with a sample containing the radionuclide to form a complex containing the complexing agent and the radionuclide in the vicinity of the detecting surface, said exposing step comprising flowing the sample over the detecting surface of the substrate so as to increase both the rate or amount of radionuclide deposition on the detecting surface and the sensitivity of the radionuclide-emission detector.

47. The method of claim 46, wherein said flowing comprises delivering the sample as a high-pressure stream to the detecting surface.

48. The method of claim 47, wherein said delivering step comprises pumping the sample to a nozzle adapted to first receive the sample and then deliver the sample as a high-pressure stream to the detecting surface.

49. The method of claim 48, further comprising directly impinging the high-pressure stream onto the detecting surface.

50. A method of increasing the sensitivity of a radionuclide-emission detector, said method comprising the steps of:

(a) providing a porous material comprising a complexing agent;

(b) exposing the porous material to a sample containing the radionuclide so that the complexing agent renders the radionuclide immobile in the porous material; and, (c) contacting a detecting surface of a substrate of the detector with the porous material comprising the complexing agent and the radionuclide, said contacting step increasing the sensitivity of the radionuclide-emission detector.

* * * * *